United States Patent [19]

Nutter

[11] Patent Number: 5,061,407

[45] Date of Patent: Oct. 29, 1991

[54] LIQUID DISTRIBUTOR FOR GAS-LIQUID CONTACT APPARATUS

[76] Inventor: Dale E. Nutter, 7935 S. New Haven St., Tulsa, Okla. 74136

[21] Appl. No.: 564,347

[22] Filed: Aug. 8, 1990

[51] Int. Cl.⁵ .................................. B01F 3/04
[52] U.S. Cl. ............................ 261/96; 261/97
[58] Field of Search ............... 261/96, 97, 110, 111, 261/DIG. 44

[56] References Cited

U.S. PATENT DOCUMENTS

| | | |
|---|---|---|
| 1,987,881 | 1/1935 | Von Seggern et al. ..... 261/DIG. 44 |
| 2,020,751 | 11/1935 | West . |
| 2,146,651 | 2/1939 | Prigge ................................ 261/113 |
| 3,232,590 | 2/1966 | Eckert ................................. 261/97 |
| 3,273,872 | 9/1966 | Eckert ................................. 261/97 |
| 3,360,246 | 12/1967 | Eckert ................................. 261/97 |
| 3,392,967 | 7/1968 | Eckert ................................. 261/97 |
| 4,101,610 | 7/1978 | Kirkpatrick et al. ............... 261/110 |
| 4,267,978 | 5/1981 | Manteufel ........................... 261/97 |
| 4,427,605 | 1/1984 | Meier et al. ......................... 261/97 |
| 4,472,325 | 9/1984 | Robbins .............................. 261/97 |
| 4,476,069 | 10/1984 | Harper et al. ....................... 261/97 |
| 4,569,364 | 2/1986 | Keller et al. ........................ 261/97 |
| 4,579,692 | 4/1986 | Bugler, III et al. ........ 261/DIG. 44 |
| 4,592,878 | 6/1986 | Scrivnor ............................. 261/111 |
| 4,689,183 | 8/1987 | Helms et al. ........................ 261/97 |
| 4,744,929 | 5/1988 | Robinson et al. ................... 261/97 |
| 4,808,350 | 2/1989 | Robbins et al. .................... 261/97 |

FOREIGN PATENT DOCUMENTS 0159804 12/1980 Japan ................................. 261/97

*Primary Examiner*—Tim Miles
*Attorney, Agent, or Firm*—Beveridge, DeGrandi & Weilacher

[57] ABSTRACT

A prebox receptacle is mounted in a pan of a distributor which distributes liquid onto a bed of packing media in a gas-liquid contact column. The pan has a substantially horizontal deck surrounded by sidewalls, and outlet openings are formed in the deck to discharge liquid from the deck onto packing media therebelow. The prebox receptacle is mounted on and supported by the pan. The prebox has a bottom wall with a liquid-receiving upper surface, and openings which feed liquid into a deceleration space located between the bottom wall of the prebox and the deck of the pan. The openings in the prebox bottom wall are horizontally displaced from the outlet openings of the deck. The boundary of the deceleration space lies between the inlet openings and the outlet openings, and the vertical area of this boundary is substantially greater than the total area of all inlet openings which feed the deceleration space, so that liquid flowing through the boundary to the outlet openings has a substantially lower velocity than liquid flowing through the inlet openings into the deceleration space. Mixing vane units are mounted in spaces between the pans to produce eddys in the ascending vapors. At least some pans have outlet openings which lead to extension troughs which themselves have liquid outlets located in areas which are not served by any outlet openings of the pans.

21 Claims, 4 Drawing Sheets

LIQUID DISTRIBUTOR FOR GAS-LIQUID CONTACT APPARATUS

BACKGROUND OF THE INVENTION

This invention relates to gas-liquid contact apparatus, and it particularly pertains to a distributor for distributing liquid onto a bed of packing media.

In a typical gas-liquid contact apparatus, packing media is contained in a sealed, vertically elongated vessel known in the industry as a column or tower. The media may be structured packings such as corrugated sheets of screen or sheet metal, or random particles such as rings or saddles, all of which are well known in the art. Liquid is usually distributed on the upper surface of the packing media by an orifice pan, trough or spray nozzle distributor. Gas is introduced to the vessel through a gas inlet nozzle, and it flows through the packing media where it contacts the liquid on the packing media surfaces before it exits through a gas outlet opening in the vessel. As the liquid moves down through the packing media under the influence of gravitational forces, it wets the surfaces of the packing media, forming a renewing liquid surface to promote the effective contact between the fluids. After the liquid passes through the packing, it flows to a liquid outlet. Normally, the gas flows countercurrent to the liquid flow, but cocurrent arrangements are sometimes used.

The efficiency of a packed column can be severely limited by the performance of the distributor. The quality of liquid distribution is measured in terms of (1) the distribution density, i.e. the number of distribution points per unit of area, (2) the geometric uniformity of distribution points throughout the cross section of the column, and (3) the uniformity of liquid flow from the distribution points.

In a gravitational distributor, the uniformity of liquid flow from the distributor points is significantly affected by entrained vapors and by the head (depth) and velocity of the liquid in the vicinity of the distributor's flow metering liquid outlets. Ideally, there are no entrained vapors, the velocities are negligible, and the heads ar substantially equal at all outlets. Such perfection is not easily attainable with present commercial and design practice methods. The liquid has vertical velocities where it is introduced to the distributor deck, and it often has horizontal velocities as it spreads out in the area of the metering orifices in the distributor deck. The heads across the extent of a distributor deck can also vary widely. Sometimes, there are "dry" outlets where there is little or no liquid head.

Some liquid distribution problems can be alleviated by using slotted flow tubes of the type described in U.S. Pat. Nos. 4,472,325, 4,808,350 or the applicant's U.S. patent application No. 07/363,786, now abandoned. Performance can be improved by forming distributors with multiple partitioned pans and precision die formed flow tubes. However, as liquid flow rates change, the distribution velocity patterns often change significantly.

The present invention makes it possible to achieve satisfactory liquid distribution over a much wider range of flow rates, while substantially improving the uniformity of flow from the distribution points by removing any entrained vapors and, in the vicinities of the distributor's liquid outlet openings, reducing turbulence, reducing horizontal velocities, and reducing head differences.

SUMMARY OF THE INVENTION

The invention pertains to apparatus for distributing liquid onto a bed of packing media in a gas-liquid contact apparatus wherein a deck is provided with outlet openings extending through it to discharge liquid from the deck onto a surface therebelow. In one respect, the invention involves an arrangement in which a wall is spaced above a deck to define a deceleration space between the wall and the deck. The deceleration space has a height which is substantially less than its horizontal dimensions. The wall has apertures which provide inlet openings for feeding liquid into the deceleration space. These inlet openings are horizontally displaced from the outlet openings of the deck so that liquid will flow horizontally through the deceleration space from the inlet openings to the outlet openings. The boundary of the deceleration space is located between the inlet openings and the outlet openings, and this boundary has a vertical area which is greater than the total area of all inlet openings associated with the deceleration space. Thus, liquid flowing through the boundary to the outlet openings has a substantially lower velocity than liquid flowing through the inlet openings into the deceleration space.

In another respect, the invention pertains to such apparatus in which a plurality of distributor decks are horizontally spaced apart. One or more mixing vane units are mounted in the ascending gases spaces between adjacent decks and each mixing vane unit has a plurality of inclined vane means for producing eddys in the ascending vapors.

Another feature of the invention is the provision of extension troughs which are associated with and receive liquid from at least some of the decks. Such extension troughs have liquid outlets located in areas which are not served by any outlet openings of the decks, thus discharging liquid onto areas of the packing media which are not served by the basic decks.

Preferably, the "deck" is the bottom wall of a pan, and the "wall" is the bottom wall of a receptacle referred to herein as a "prebox" which receives liquid from a feed means. The deck and wall are elongated. The deck is surrounded by sidewalls, and the wall is supported from the deck by spacers which may be feet extending down from the wall to contact the deck.

Although the invention may take many forms, a preferred embodiment is shown in the following drawings.

BRIEF DESCRIPTION OF THE DRAWINGS

FIG. 1 is a diagrammatic plan view as would be seen along the section line I—I in FIG. 1a.

DETAILED DESCRIPTION

Figure 1:
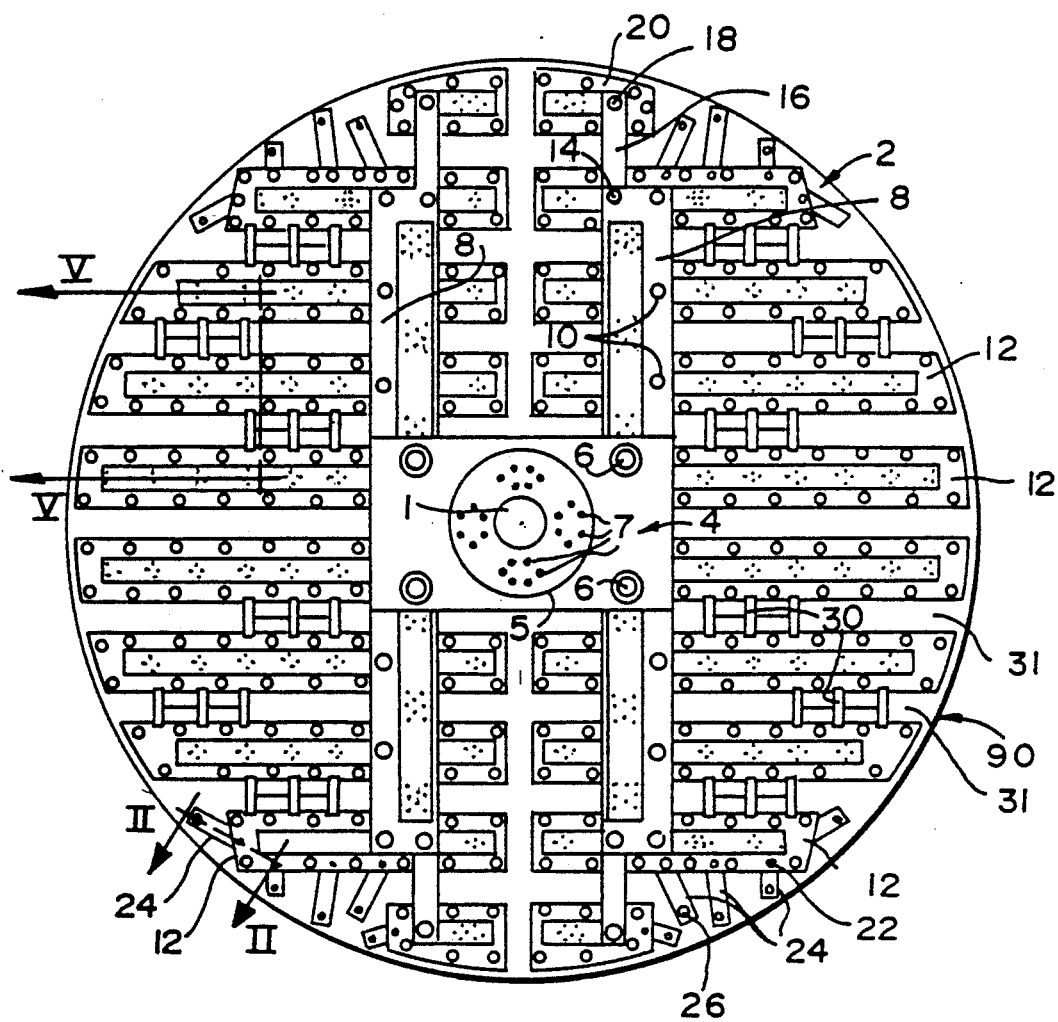
Figure 2:
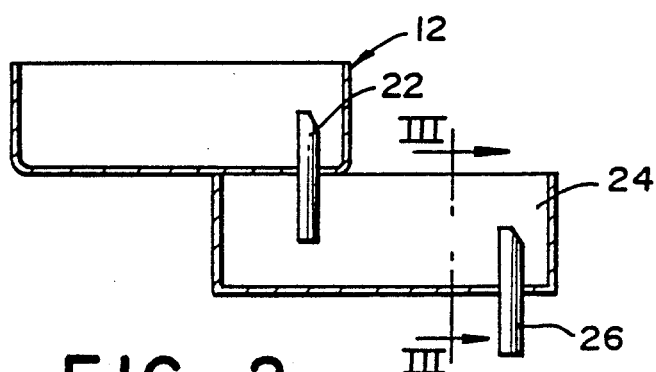
FIG. 2 is a sectional view of an extension trough as seen along the line II—II in FIG. 1.
Figure 3:
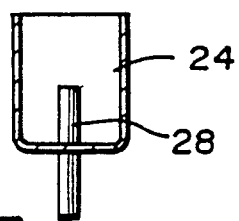
FIG. 3 is a sectional view of the extension trough as seen along the line III—III in FIG. 2.
Figure 1A:
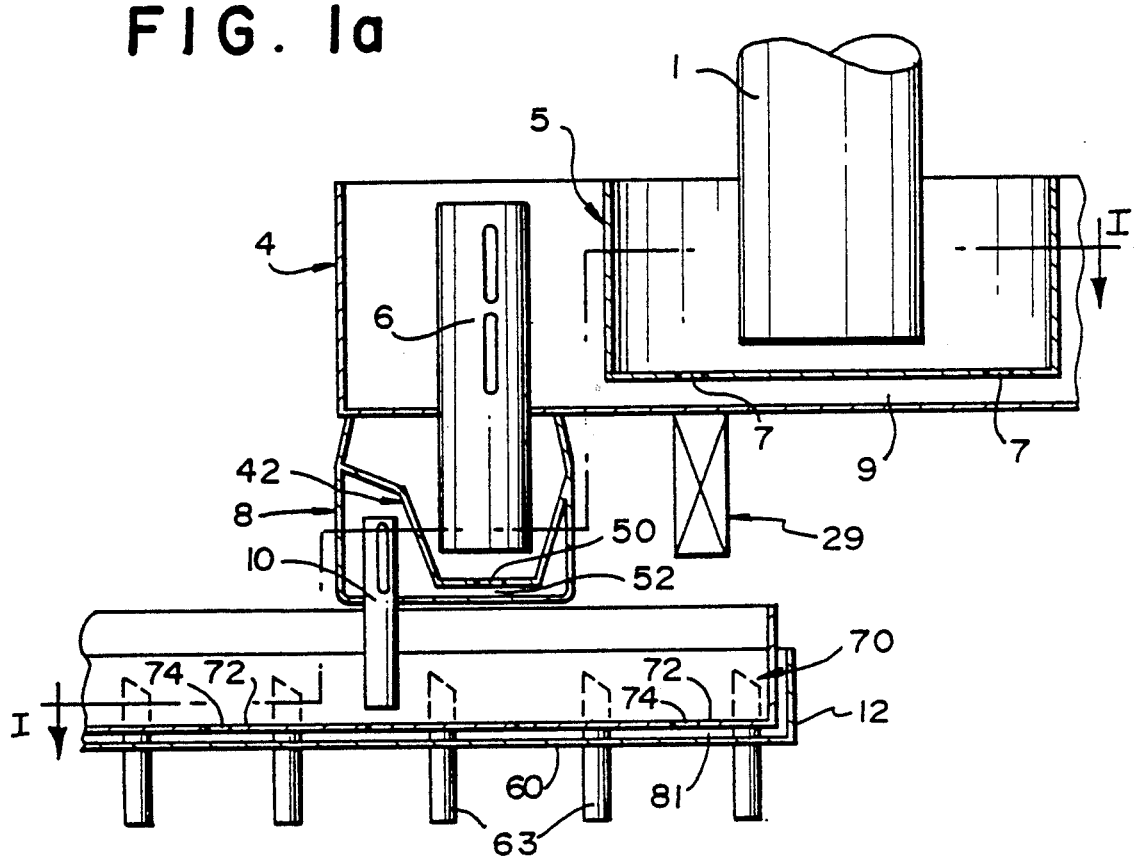
FIG. 1a is a vertical section of a portion of the apparatus.

FIG. 1 is a plan view of a distributor 2 in a column. Liquid from a feed pipe 1 or internal apparatus is introduced at the center of a rectangular primary or center parting box 4 which has outlet openings 6 in its bottom wall. As best shown in FIG. 1a, a prebox receptacle 5 affixed to the parting box 4 has a bottom wall provided with openings 7 which admit liquid into a space 9 defined by the bottom walls of the prebox 5 and the parting box 4, respectively. Liquid from the outlet openings 6 of parting box 4 flows into four secondary or zone parting boxes 8, each of which has four vertically slotted tubes 10 which provide outlet openings to feed liquid to the main distributor pans 12. Each zone parting box 8 also has a vertically slotted tube 14 which discharges into a trough 16 with an outlet 18 which feeds liquid to the outermost distributor pans 20. Some of the main distributor pans 12 have slotted outlet tubes 22 leading to extension troughs 24 which have slotted outlets tubes 26 providing pour points in areas which are not geometrically available to be served by any of the distribution pans 12 or 20. FIGS. 2 and 3 are longitudinal and transverse views of an extension trough 24 in which the liquid outlet is via a slotted flow tube 28.

In large columns, as shown in FIG. 1a, pans 12 of fractional chord length may be hung from a truss 29 which underlies the center parting box 4. The zone parting boxes 8 are supported by the pans 12. In smaller columns, i.e. columns which have diameters less than eight feet, the pans 12 can have a full chord length, and they may all be fed by one center parting box, without any zone parting boxes.

Figure 5A:
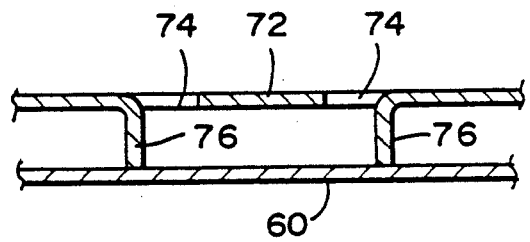
FIG. 5a is an enlarged sectional view showing the apertures and the prebox-supporting feet according to a preferred embodiment of the invention.
Figure 5B:
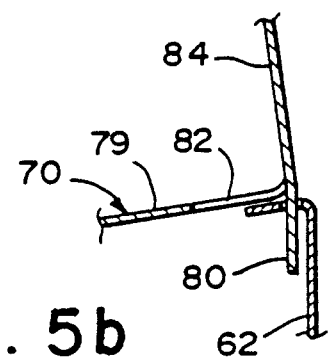
FIG. 5b is an enlarged sectional view showing details of a preferred prebox-to-pan connection.
Figure 5:
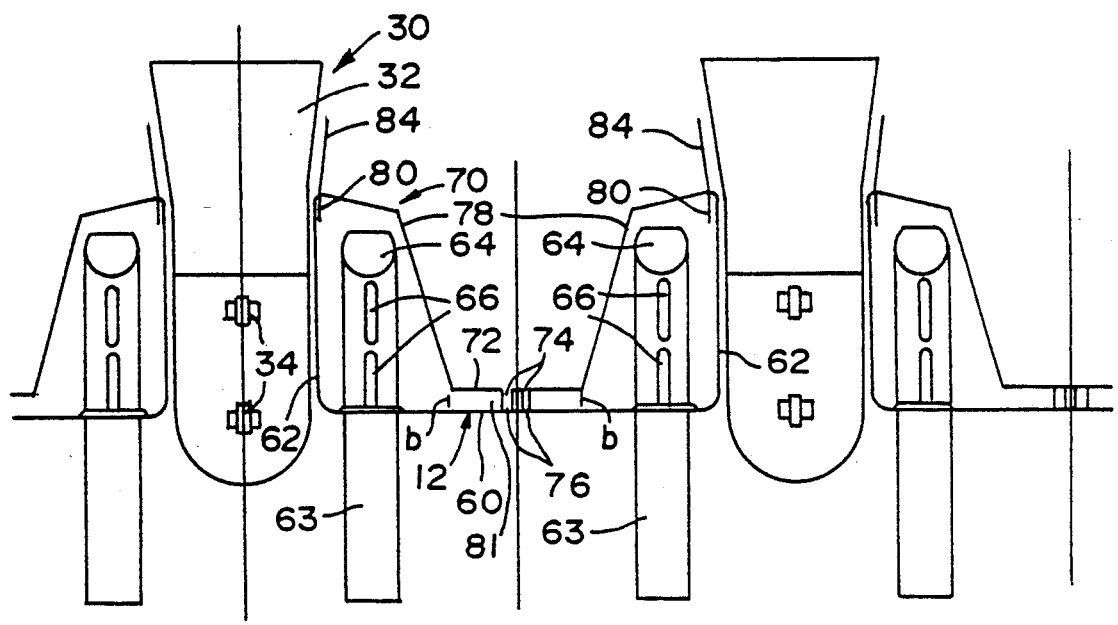
FIG. 5 is a sectional view as seen along the line V—V in FIG. 1.
Figure 4:
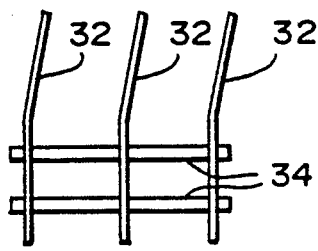
FIG. 4 is a side elevation of a deflector vane unit constructed according to the invention.

The distributor pans 12 and 20 are spaced apart to provide spaces 31 for ascending gases. To enhance vapor remixing eddys at the distributor, inclined mixing vane units 30 are inserted in the spaces 31 between the distributor pans. As illustrated in FIG. 4, each of these units 30 has three vanes 32 which are uniformly spaced and connected together by turn-lock strips 34. Each vane has a vertical lower portion of uniform width, and an inclined upper portion which is widened to prevent the vane units from slipping down from the respective ascending gas space. As shown in FIG. 5, the edges of these vanes are sloped so they may wedge against the prebox walls 84 described later in this specification. During manufacture, one of the turn-lock strips 34 is inserted in horizontal slots in the vanes 32 until notches in the opposite edges of the strip 34 are aligned with the vanes 32. The strip 34 is then rotated about its longitudinal axis so that its notches engage and retain the vanes 32. Similar turn-lock strips in another apparatus are disclosed in U.S. Pat. No. 4,557,876. The vane units are supported on the edges of adjacent pans, and they are oriented and positioned where their inclined top baffles will create rotational flow to mix the ascending vapors. Adjacent units may have their vanes inclined in opposite directions.

Figure 6:
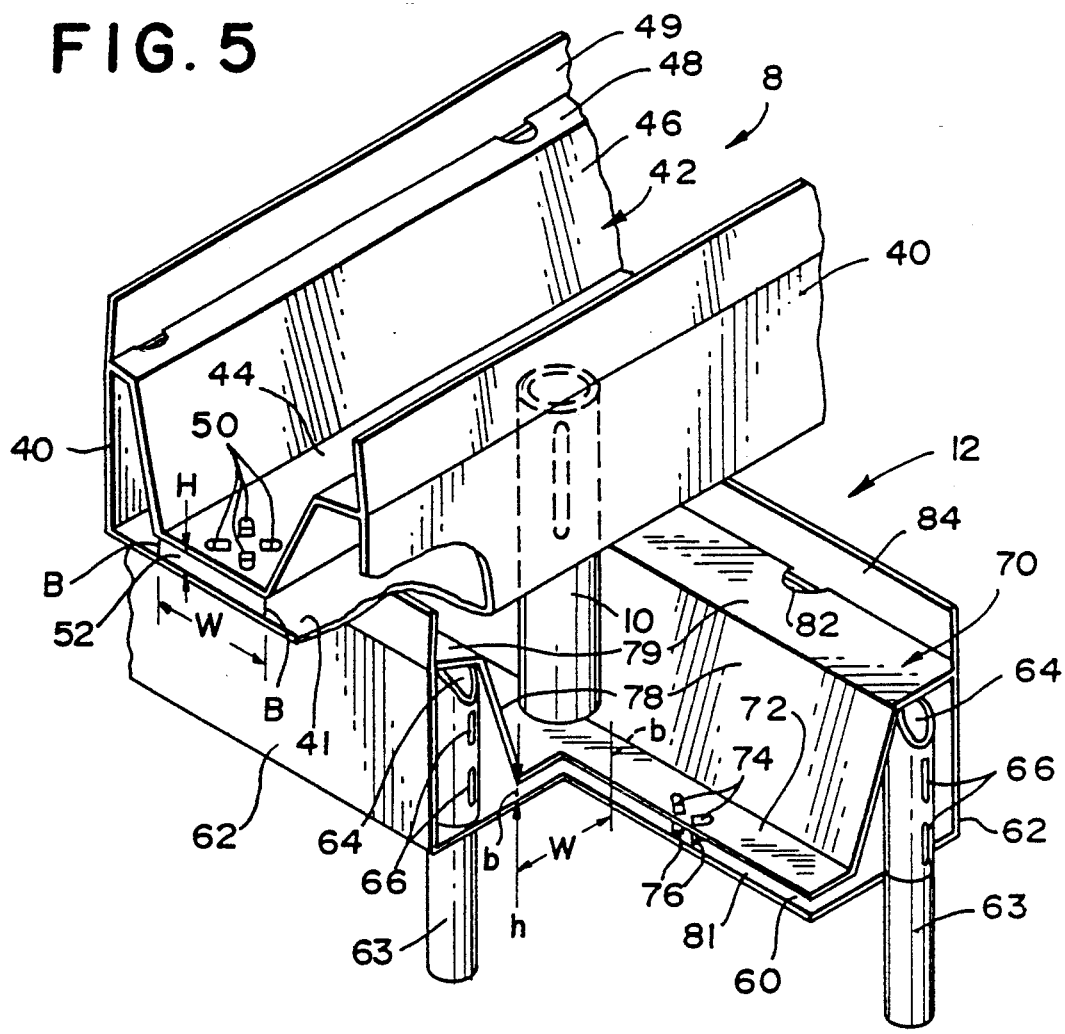
FIG. 6 is an isometric view of a portion of the apparatus.

FIG. 6 shows a portion of a zone parting box 8 and a distributor pan 12, both of which are provided with preboxes according to the invention. The zone parting box 8 has two sidewalls 40 and a deck or bottom wall 41 which has outlet openings such as slotted tubes 10 for releasing liquid into the distributor pan 12. The prebox 42 is a receptacle which is mounted in the parting box 8. This prebox has a bottom wall 44, sloped sidewalls 46, upwardly divergent sloped flanges 48, and upper sidewall extensions 49. Downwardly extending tabs struck from the flanges 48 position the prebox 42 on the parting box 8. A similar tab arrangement is described below in connection with FIG. 5b. Openings 50 are formed in the bottom wall 44 to admit liquid into the space 52 between the walls 41 and 44. This space has a height H defined by the walls 41 and 44, and a width W defined by the lateral boundaries B.

The total area of the openings 50 is less than the area of the boundary of the space 52. Due to this relationship, the space 52 acts as a deceleration space, as the liquid exits through the boundary at a lower velocity than it had when it entered through the openings 50.

The prebox 42 allows time for disengagement of entrained vapor, lateral distribution of the liquid depths, and substantial reduction of the liquid velocities in the parting box. Thus, liquid is released at substantially equal flow rates into the five distributor pans 12 and 20 served by the parting box openings 10 and 14.

As shown in FIGS. 5 and 6, the distributor pan 12 includes a deck 60 and two sidewalls 62. Liquid outlet openings through the deck 60 are provided by a set of flow tubes 63 which are affixed to and extend through the deck. Above the deck, each flow tube has an inclined open upper end 64 and vertical slots 66. Liquid on the deck 60 flows through the orifice metering slots 66 into the tubes 63, down through the tubes 63, and then onto the bed of packing material.

To promote uniformity of flow through the flow tubes 63 or other kinds of outlet openings, prebox members 70 are mounted in the distributor pans. The distributor 12 pans and their respective preboxes 70 are horizontally elongated. The prebox 70 shown in FIG. 6 is a receptacle which has a bottom wall 72 provided with openings 74 for releasing liquid into the distributor pan 12. The openings 74 are sometimes formed by bending tabs from the bottom wall. As best shown in FIG. 5a, the bent tabs provide feet 76 which support the bottom wall 72 on the deck 60 of the pan 12. Extra sieve holes (not shown) can be added to any of the preboxes to provide orifice areas and locations suited to adjust the head and/or to compensate for peculiar geometric limitations.

The prebox has sidewalls 78 that extend up from opposite edges of the bottom wall 72, sloped flanges 79 that extend in opposite directions from the upper edges of the sidewalls 78, and upper sidewall extensions 84. The upwardly divergent slopes of the walls 78 and flanges 79 maximizes the effective width of the prebox to minimize liquid velocities and to maximize the free surface area where the vapor phase can disengage from the liquid phase. As shown in FIG. 5b, tabs 80 are bent from the flanges 79 and project down from the upper sidewall extensions 84 and inside the pan sidewalls 62 to position the prebox 70 in the pan 60. The vents 82 resulting from these tabs 80 prevent any vapor pressure differentials across the prebox wall.

The deck 60 and the bottom wall 72 of the prebox define a deceleration space 81 having a height h which is substantially less than its horizontal dimensions. The horizontal width of the deceleration space 81 is designated w. The openings 74 in the wall 72 act as inlet apertures which feed liquid gravitationally into the space 81. The boundary of the deceleration space lies in vertical planes, which include the lines b, between the inlet openings 74 and the flow tubes 63. The vertical area of the boundary of the deceleration space 80 is substantially greater than the total area of the openings 74 which lead to the space 81.

At all levels, the deceleration spaces have heights which are substantially less than their horizontal dimensions. It is believed that the H:W and h:w ratios should be 1:2 or less.

Figure 7:
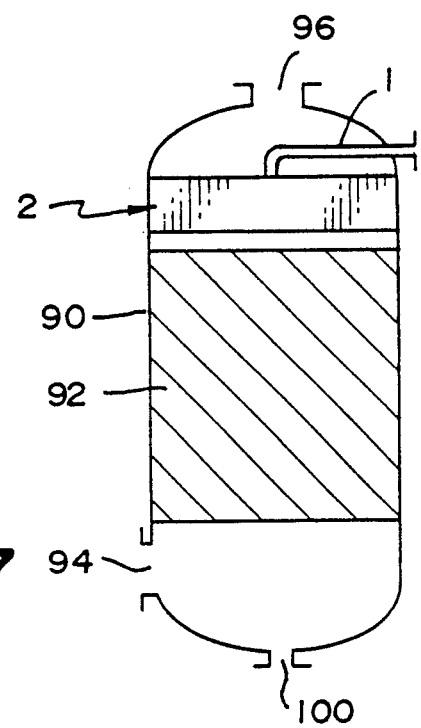
FIG. 7 is a schematic view showing the location in a tower where the apparatus according to the invention is installed.

As shown schematically in FIG. 7, the distributor is installed in a column 90, above a bed 92 of random packing or structured packing. Gas flows from inlet 94 through the bed 92 of packing media through the distributor 2, and to outlet 96. Liquid flows from a feed pipe 1 to the distributor 2, through the distributor 2 to the bed 92 of packing media, through the bed 92, and to the liquid outlet 100.

During normal operation of a distributor constructed according to the invention, the liquid flows from feed pipe 1 into the main prebox 5 which provides some residence time for deentrainment. The liquid flows through openings 7 into the deceleration space 9 of the primary parting box where turbulence and velocities are reduced. The liquid then flows to and through outlets 6 in the center parting box into the zone parting boxes 8 which themselves have preboxes 42 and deceleration spaces 52. From outlets 10 in the zone parting boxes 8, the liquid flows into the preboxes of the distributor pans 12 and 20.

Some of the kinetic energy of the liquid is dissipated when the liquid strikes a liquid-receiving area on the upper surface of the bottom wall of each prebox 5, 42 and 70, near its upstream end. The liquid in the prebox may initially contain entrained vapors, and additional entrained vapors may result from flashing or turbulence in the prebox. The vapor phase may deentrain while the liquid is in the prebox, and such deentrainment is enhanced by maximizing the surface area of the liquid and sloping the prebox walls. Rather than flowing directly to the outlets 6, 10 and 63 as if there were no preboxes, the liquid flows horizontally through the preboxes to their outlet openings. In the elongated preboxes 12 at low liquid feed rates, some of the liquid travels farther lengthwise of the pan 12 or 20 before it flows onto the deck 60 and flows to, into and through the flow tubes 63.

The liquid in the preboxes 5, 42 and 70 can be quite turbulent. When the liquid flows through the openings 7, 50, 74, some of its kinetic energy is partially dissipated due to impact with the bottom wall of 4, 8 or 12 and/or with liquid in the deceleration space 9, 52 or 81. The liquid then flows horizontally from the openings 7, 50, 74 to the outlets 6, 10 or 63. Since the vertical area of the boundary surrounding each deceleration space is substantially greater than the total area of all of the inlet openings leading to the respective deceleration space, the liquid flowing across the boundary has a substantially lower velocity than liquid flowing into the deceleration space. Further deceleration occurs when the liquid passes the boundary, as it moves into a zone of greater depth.

Important benefits of the invention are that it provides a more uniform irrigation of the packing media, it promotes deentrainment of vapor phase from the liquid phase prior to distribution, it reduces horizontal liquid velocities in the distributor pan, it provides more uniform heads throughout the distributor pan, and it enables the apparatus to operate satisfactorily over a greater range of liquid flow rates and liquid heads.

An important measure of distributor performance is the coefficient of variation ("CV"). It is determined by measuring the flow rate values at each of the pour points of a distributor, and subjecting these flow rate values to statistical analysis. CV is the standard deviation of these values, divided by the mean value, expressed as a percentage. A CV less than 10% has proven to be sufficient to permit commercial packings to achieve their potential efficiency.

Figure 8:
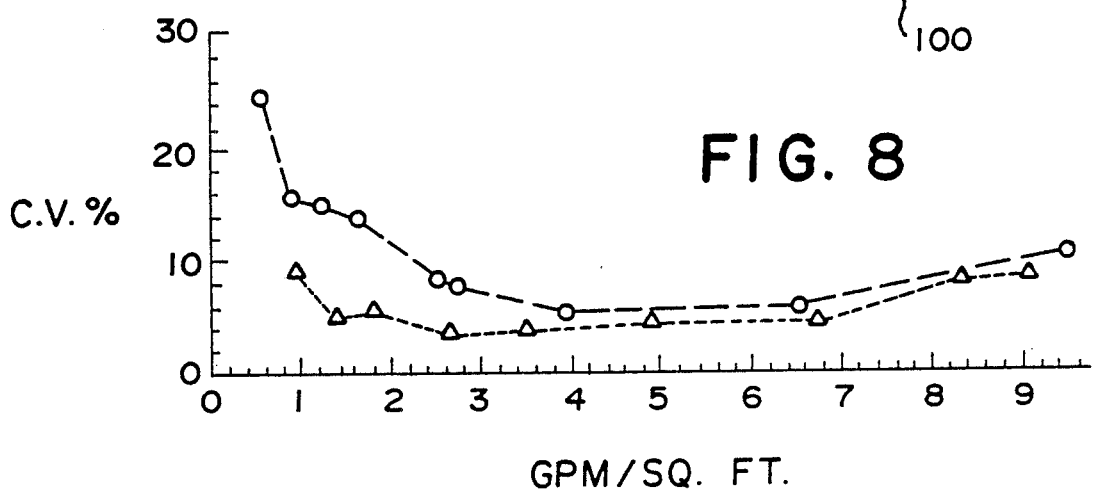
FIGS. 8 and 9 are graphs showing the superior distributor performance achieved by the invention.

FIG. 8 shows CV as a function of liquid flow rates ranging from about 1 to 9 gallons per minute per square foot. The triangle-marked line was obtained from one elongated pan with flow tubes and a prebox. It shows that throughout this range of flow rates, the CV never exceeds 10% and it is usually 6% or less.

The circle-marked line in FIG. 8 represents data from a comparable size distributor similar to the one disclosed in U.S. Pat. No. 4,808,350. At low flow rates, the distributor pan according to the invention is significantly superior, and throughout the entire range of flow rates the present invention provides a lower CV.

Figure 9:
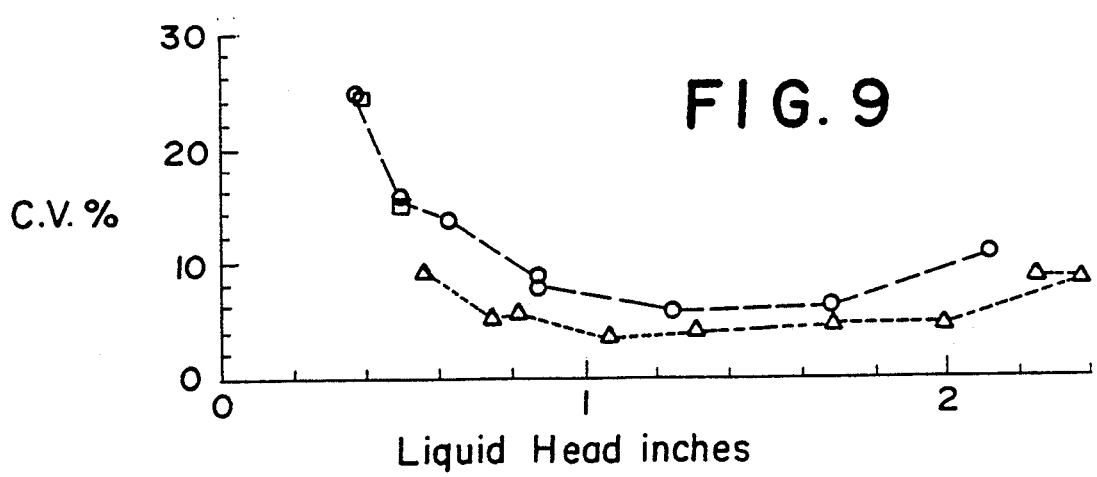

The coefficients of variations ("CV") as a function of liquid head on the distributor deck are shown in FIG. 9. The lines marked by triangles and circles are for the same structures which provided the data of FIG. 8. Throughout the range of heads from 0.6 inch to 2.4 inch, the distributor pan constructed according to the invention provided superior distribution.

Persons familiar with the field of the invention will realize that it is capable of many modifications which differ from the illustrated embodiment. For example, the liquid outlets may be provided by flow tubes 6, 10 and 63, round holes, square holes, or openings of any suitable form or shape. Therefore, it is emphasized that this invention is not limited to the disclosed embodiments but embraces a wide variety of apparatuses and methods which fall within the spirit of the following claims.

I claim:

1. Apparatus for distributing liquid onto a bed of packing media in a gas-liquid contact apparatus, comprising, a deck provided with outlet openings extending therethrough to discharge unaerated liquid from said deck onto a surface therebelow, a wall spaced above said deck to define a deceleration space between said wall and said deck, said deceleration space having a height which is less than its horizontal dimensions, apertures in said wall providing inlet openings for feeding liquid into said deceleration space, said inlet openings being horizontally displaced from substantially all of said outlet openings so that liquid flows horizontally through said deceleration space from the inlet openings to the outlet openings, said deceleration space having a boundary located between the inlet openings and substantially all of the outlet openings, said boundary having a vertical area which is substantially greater than the total area of all inlet openings associated with said deceleration space, whereby liquid flowing through said boundary to said outlet openings has a substantially lower velocity than liquid flowing through said inlet openings into said deceleration space.

2. Apparatus according to claim 1 wherein said outlet openings are provided by flow tubes which protrude above and extend through said deck, said flow tubes having walls which have metering orifices therein.

3. Apparatus according to claim 1 provided with spacers which support said wall on said deck.

4. Apparatus according to claim 1 including a receptacle located above said deck, said wall being a bottom wall of said receptacle, and means for feeding liquid into said receptacle.

5. Apparatus according to claim 1 wherein said deck and said wall are horizontally elongated in a same direction and have substantially equal lengths.

6. Apparatus according to claim 1 wherein sidewalls are provided around said deck, said receptacle being supported from said sidewalls.

7. Apparatus according to claim 1 having feet which extend down from said wall to support said wall on said deck.

8. Apparatus according to claim 1 wherein said boundary is submerged.

9. Apparatus according to claim 1 including a pressure vessel and a bed of packing media in said vessel, said deck being located above said bed of packing media so that liquid from said outlet openings is discharged onto said packing media.

10. Apparatus according to claim 1 wherein said wall has an upper surface which has an infeed area, means for feeding liquid onto said infeed area, sidewalls extending up from said wall and being sloped to promote gravitational phase separation of entrained vapors from liquid on said upper surface.

11. Apparatus according to claim 10 wherein said deck and said wall are horizontally elongated.

12. Apparatus according to claim 1 wherein the distributing apparatus is formed of a plurality of elongated pans which are spaced apart to permit gas to flow between said pans, each of said pans having a said deck as its bottom wall.

13. Apparatus for distributing liquid onto a bed of packing media in a as-liquid contact apparatus, comprising,
    a plurality of decks each provided with outlet openings extending therethrough to discharge liquid from each said deck onto packing media therebelow,
    said decks being horizontally spaced apart to provide ascending gas spaces through which vapors may ascend,
    a mixing vane unit mounted in an ascending gas space, said mixing vane unit including a plurality of inclined vane means for producing eddys in ascending vapors.

14. Apparatus according to claim 13 in which each of said vane means includes a vertical portion and an inclined portion.

15. Apparatus according to claim 13 in which said vane means are connected together by elongated strips.

16. Apparatus according to claim 13 in which said vane means have widened upper portions which prevent the vane unit from slipping down from the ascending gas space.

17. Apparatus for distributing liquid onto a bed of packing media in a gas-liquid contact apparatus, comprising,
    a plurality of decks each provided with outlet openings extending therethrough to discharge liquid from each said deck onto packing media therebelow,
    extension troughs associated with at least some of said decks, said decks having outlet openings leading to respective extension troughs, said extension troughs having liquid outlet for discharging liquid onto packing media therebelow, said liquid outlets from the extension troughs being located in areas which are not served by any outlet openings of the decks.

18. Apparatus according to claim 17 wherein said liquid outlets from the extension troughs are provided by tubes which have openings in their walls.

19. Apparatus for distributing liquid onto a bed of packing media in a gas-liquid contact apparatus, comprising,
    a plurality of decks each provided with outlet openings extending therethrough to discharge liquid from each said deck onto packing media therebelow,
    a wall spaced above each said deck to define a deceleration space between each said wall and its respective said deck, said deceleration space having a height which is less than its horizontal dimensions,
    apertures in each said wall providing inlet openings for feeding liquid into a respective said deceleration space, said inlet openings being horizontally displaced from said outlet openings of the respective deck so that liquid flows horizontally through said deceleration spaces from the inlet openings to the outlet openings,
    each said deceleration space having a boundary located between the inlet openings and the outlet openings, each said boundary having a vertical area which is substantially greater than the total area of all inlet openings associated with the respective said deceleration space, whereby liquid flowing through said boundary to said outlet openings has a substantially lower velocity than liquid flowing through said inlet openings into said deceleration space,
    said decks being horizontally spaced apart to provide ascending gas spaces through which vapors may ascend,
    a mixing vane unit mounted in an ascending gas space, said mixing vane unit including a plurality of inclined vane means for producing eddys in the ascending vapors,
    extension troughs associated with at least some of said decks, said decks having outlet openings leading to respective extension troughs, said extension troughs having liquid outlets for discharging liquid onto packing media therebelow, said liquid outlets from the extension troughs being located in areas which are not served by any outlet openings of the decks.

20. Apparatus for distributing liquid onto a bed of packing media in a gas-liquid contact apparatus, comprising,
    a deck provided with outlet openings extending therethrough to discharge unaerated liquid from said deck onto a surface therebelow,
    a wall spaced above said deck to define a deceleration space between said wall and said deck, said deceleration space having a height which is less than its horizontal dimensions,
    apertures in said wall providing inlet openings for feeding liquid into said deceleration space, said inlet openings being horizontally displaced from said outlet openings so that liquid flows horizontally through said deceleration space from the inlet openings to the outlet openings, said deceleration space having a boundary located between the inlet openings and the outlet openings, said boundary having a vertical area which is substantially greater than the total area of all inlet openings associated with said deceleration space, whereby liquid flowing through said boundary to said outlet openings has a substantially lower velocity than liquid flowing through said inlet openings into said deceleration space, said wall having an upper surface which has an infeed area, means for feeding liquid onto said infeed area, sidewalls extending up from said wall and being sloped to promote gravitational phase separation of entrained vapors from liquid on said upper surface.

21. Apparatus according to claim 20 wherein said deck and said wall are horizontally elongated.

* * * * *